(12) United States Patent
Augesky et al.

(10) Patent No.: US 9,793,711 B2
(45) Date of Patent: Oct. 17, 2017

(54) MODULARLY REDUNDANT DC-DC POWER SUPPLY ARRANGEMENT HAVING OUTPUTS THAT CAN BE CONNECTED IN PARALLEL

(71) Applicant: Siemens Aktiengesellschaft, Munich (DE)

(72) Inventors: Christian Augesky, Vienna (AT); Harald Schweigert, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 261 days.

(21) Appl. No.: 14/376,919

(22) PCT Filed: Jan. 15, 2013

(86) PCT No.: PCT/EP2013/050621
§ 371 (c)(1),
(2) Date: Sep. 2, 2015

(87) PCT Pub. No.: WO2013/117388
PCT Pub. Date: Aug. 15, 2013

(65) Prior Publication Data
US 2016/0006351 A1   Jan. 7, 2016

(30) Foreign Application Priority Data
Feb. 6, 2012   (EP) .................................. 12153970

(51) Int. Cl.
*H02J 1/10* (2006.01)
*H02M 3/158* (2006.01)
(Continued)

(52) U.S. Cl.
CPC ............... *H02J 1/102* (2013.01); *H02J 1/10* (2013.01); *H02M 3/158* (2013.01);
(Continued)

(58) Field of Classification Search
CPC ........ H02M 3/1584; H02M 7/08; H02J 1/102; H02J 1/10; H02J 3/14; D05F 33/02
(Continued)

(56) References Cited

U.S. PATENT DOCUMENTS 6,525,435 B2 *   2/2003   Lau ......................... H02J 1/102
                                                    307/52
6,671,194 B2 *   12/2003  Takahashi ............... H02M 1/36
                                                    363/65

(Continued)

FOREIGN PATENT DOCUMENTS

| WO | WO 2005109154 | 11/2005 |
| WO | WO 2005109154 A2 | 11/2005 |
| WO | WO 2010149205 A1 | 12/2010 |

*Primary Examiner* — Nguyen Tran
(74) *Attorney, Agent, or Firm* — Cozen O'Connor

(57) ABSTRACT

A power supply device for redundantly supplying power to a load comprises a first supply unit, a second supply unit, a first DC-DC converter, a second DC-DC converter, a first output switching controller, and a second output switching controller. The first and second supply units are interconnected. The first output switching controller is connected on the load side of the first DC-DC converter, and the second output switching controller is connected on the load side of the second DC-DC converter. The outputs of the output switching controllers are interconnected.

18 Claims, 7 Drawing Sheets

(51) Int. Cl.
*H02M 3/335* (2006.01)
*H02J 9/06* (2006.01)
*H02M 1/00* (2006.01)

(52) U.S. Cl.
CPC ............ *H02M 3/1584* (2013.01); *H02J 9/06* (2013.01); *H02M 3/33523* (2013.01); *H02M 2001/007* (2013.01); *Y02B 70/1425* (2013.01); *Y02B 70/1433* (2013.01); *Y02P 80/112* (2015.11)

(58) Field of Classification Search
USPC ........... 323/272; 363/65, 67; 307/18–19, 29, 307/36–38, 82
See application file for complete search history.

(56) References Cited

U.S. PATENT DOCUMENTS

| | | | |
|---|---|---|---|
| 8,295,066 B2 * | 10/2012 | Lin | H02M 3/285 363/65 |
| 2004/0003306 A1 | 1/2004 | Oomori | |
| 2005/0094330 A1 * | 5/2005 | Guenther | H02J 1/102 361/18 |
| 2006/0273770 A1 * | 12/2006 | Siri | H02M 3/157 323/272 |
| 2009/0271642 A1 | 10/2009 | Cheng | |
| 2009/0290385 A1 * | 11/2009 | Jungreis | H02M 1/4241 363/17 |

* cited by examiner

MODULARLY REDUNDANT DC-DC POWER SUPPLY ARRANGEMENT HAVING OUTPUTS THAT CAN BE CONNECTED IN PARALLEL

CROSS-REFERENCE TO RELATED APPLICATIONS

This is U.S. national stage of PCT Application No. PCT/EP2013/050621, filed on Jan. 15, 2013, which claims priority to European Patent Application No. EP 12153970.4, filed on Feb. 6, 2012, each of which is hereby incorporated herein in its entirety by reference.

FIELD OF INVENTION

The invention relates to a power supply arrangement for redundantly supplying power to a load, wherein the power supply arrangement comprises a first supply unit and a second supply unit that are interconnected.

DESCRIPTION OF THE RELATED ART

Electrical installations are often governed by particular safety requirements or the need for high availability. Critical parts of such installations are implemented to offer redundancy in order to prevent failure of the installation if a fault occurs. This also relates to power supply arrangements.

According to the prior art, a redundant power supply arrangement includes two separate supply units whose outputs are interconnected via a redundancy circuit. In this case, each supply unit is configured for the load that is to be connected.

The simplest form of redundancy circuit includes diodes, which are provided for decoupling purposes at the outputs of the supply units (FIG. 1). Each supply unit regulates the output voltage separately, wherein asymmetries inevitably occur between the powers that are released by the supply units. Even during error-free operation, one supply unit will, therefore, deliver considerably more power. This results in uneven wear of the two supply units, whereby it can be assumed that one of the two units will have a shorter service life.

Diodes result in excessive losses when higher powers are supplied. Relays or semiconductor switches are, therefore, also used for decoupling purposes (FIG. 2). Here, likewise, the wear of the two supply units is uneven, because only that supply unit connected to a load via the switch is under load during normal operation. Moreover, a brief interruption of supply occurs during a switchover operation in the event of a fault.

SUMMARY OF THE INVENTION

An object of the invention is to improve the prior art for a power supply arrangement of the type cited in the introduction.

This object is achieved by the features and arrangements disclosed in the claimed invention.

In one embodiment, the power supply arrangement is implemented as a device having a first and a second DC-DC converter, wherein a first output switching controller is connected on the load side of the first DC-DC converter and a second output switching controller is connected on the load side of the second DC-DC converter, and wherein the outputs of the output switching controllers are interconnected.

The redundant power supply arrangement according to the present invention is implemented as a device having two parallel paths, each of which comprises two converter stages. This eliminates the requirement to decouple the outputs using a redundancy circuit. It also ensures favorable component loading while minimizing the structural size and the losses that occur. The cabling costs are also reduced in comparison with known solutions.

Each path is configured for the total power of the load that is to be supplied. It is possible to alternately isolate the two paths internally in this case such that the supply of a load takes place alternately via one of the two paths. In the case of operating states with low power consumption in particular, the supply is advantageously provided by one path alone, in order to minimize losses.

Alternatively, half of the load is carried by both paths, thereby ensuring even wear to all device parts as in the case of alternating operation.

In one embodiment, a supervisory control unit is configured to predetermine the power distribution of the output switching controllers. The total power released at the connected output is then distributed over the two output switching controllers as predetermined by the control unit.

In one embodiment, the supervisory control unit is configured to ensure symmetry of power at the output switching controllers. Each path has its own current regulating device/apparatus in this case, while shared voltage regulating device/apparatus are provided by a supervisory control unit.

Alternatively, at least one operating parameter is supplied to the control unit, which is configured to influence as a function of this operating parameter the operation of the DC-DC converters and the output switching controllers. The at least one operating parameter is e.g., a temperature or an operation-related voltage load of a critical component (e.g., transistor, etc.). An asymmetric power distribution of the two paths is deliberately set by the supervisory control unit as a function of such operating parameter(s). This is advantageous in the context of different cooling conditions, for example. If a module is positioned directly adjacent to a side of a device, this will adversely affect the cooling of this side. The wear and hence the service life of the two converters and/or switching controllers can be balanced by distributing the continuous power according to the temperature.

In one embodiment, at least two output switching controllers are connected on the load side of each DC-DC converter. This increases the flexibility when supplying multiple loads. It also removes the need to provide more powerful and hence more expensive components for larger loads. Higher output powers can easily be achieved by interconnecting a plurality of output switching controllers of a path.

In one embodiment, the DC-DC converters are preferably designed as resonance converters in order to restrict switching losses.

In one embodiment, a dedicated protection unit is connected on the line side of each DC-DC converter to separate the respective DC-DC converter from the rest of the device circuit in the event of a predetermined overload. Each converter unit, therefore, has internal device protection. In the case of an arrangement having a shared line rectifier and a shared radio interference filter, a fuse is arranged downstream of the filter in each converter supply line, for example. In the event of a component fault in a converter, the other converter can continue to function. A protection unit may take the form of a safety fuse, a mechanical protective switch, or a fast-acting semiconductor switch which allows almost reaction-free isolation of the faulty branch, for example.

In one embodiment, a dedicated DC link is connected on the line side of each DC-DC converter and can be connected to a supply network via a rectifier unit. The redundancy also extends to the rectifier components and DC link components in this context. In this case, a connection interface of at least one DC link can advantageously be switched between a supply network and a supply unit using a switch. If the supply network fails, the DC link is connected to the supply unit. This supply unit is e.g., a battery for maintaining buffered operation.

In one embodiment, both DC-DC converters are connected to a shared DC link, which can be connected to a supply network via a rectifier unit. Here, likewise, it is advantageously possible to switch over to a different supply unit for buffered operation. The shared use of the rectifier and DC link components is sufficient for many applications, because the failure risk of these components is considered to be lower than that of the converter components.

In one embodiment, the respective rectifier unit can advantageously be connected to a supply network via a passive filter in order to prevent harmonic waves in the supply network. In some embodiments, outputs of the output switching controllers can be interconnected in series in order to cope with higher output voltages.

A device offering particularly flexible options for use is produced when the outputs of the first and second output switching controllers for redundantly supplying power to a load are interconnected in parallel. An additional first output switching controller is connected on the load side of the first DC-DC converter, and an additional second output switching controller is connected on the load side of the second DC-DC converter. The further output switching controllers can be used to supply additional loads or to increase the failure protection of the power supply arrangement.

In order to increase the failure protection, the output of the first DC-DC converter, the input of the first output switching controller and the output of the additional first output switching controller are routed to a first switch unit of the device, and the input of the first output switching controller is switchable between the output of the first DC-DC converter and the output of the additional first output switching controller using the first switch unit. In addition, the output of the second DC-DC converter, the input of the second output switching controller and the output of the additional second output switching controller are routed to a second switch unit of the device, and the input of the second output switching controller is switchable between the output of the second DC-DC converter and the output of the additional second output switching controller using the second switch unit.

In this case, the output switching controller and the additional output switching controller of a path are connected in series for increased safety. According to the invention, the output switching controller currently connected on the load side assumes the function of a safety switch which isolates the faulty supply path from the output in the event of a fault. This measure is primarily advantageous if a fault in an output switching controller connected on the line side would result in a short circuit at the output.

In one embodiment, each output switching controller is adapted as a step-down switching controller. A rectified supply network voltage is converted to extra-low voltage using DC-DC converters. This extra-low voltage provides the level for the generation of a lower output voltage using step-down switching controllers. By virtue of the extra-low voltage, external supply units for buffered operation or additional step-down switching controllers for supplying additional loads can be attached without danger. Configuration changes to the power supply arrangement can, therefore, be performed by an operator without further safety precautions. This also ensures a low output level for the step-down switching controllers, whereby good efficiency of the step-down switching controllers can be achieved. Specifically, it is possible to use components, in particular semiconductors, which exhibit low losses at low voltages by virtue of their manufacturing technology.

Provision of a step-up switching controller is effective if a higher output voltage is also required. The step-up switching controller is advantageously the penultimate stage of a multistage power supply arrangement in this case.

In one embodiment, a method for a power supply arrangement comprising switch units as described above, the method comprises signaling to a control unit a connection of the input of one output switching controller to the output of an additional output switching controller by a switch unit, and activating the output switching controller connected on the load side as a decoupling diode.

In this case, it is advantageous to predetermine a current limit for each output switching controller activated as a decoupling diode. The current limit is set higher by at least a setting tolerance and an expected age drift than a current limit of the output switching controller connected on the line side, which regulates the voltage and/or limits the current to a set value at the output. This means that the current limit of the output switching controller connected on the load side is not reached during normal operation.

Likewise, in each output switching controller activated as a decoupling diode, a voltage regulating unit is advantageously set to a value which is higher by at least a setting tolerance and an expected age drift than a maximum output voltage of the output switching controller connected on the line side.

Furthermore, the method includes monitoring the current flow direction in each of the two paths during decoupling activation, and interrupting the current flow if the current flows from the output to the input of the respective output switching controller.

In one embodiment, the method further comprises predetermining a maximum permitted output voltage for a voltage regulating unit of the output switching controller which is activated as a decoupling diode in each case. The maximum permitted output voltage corresponds in this case to any voltage which is permissible for a load that is to be supplied. This provides an effective overvoltage protection.

In this case, a warning signal is generated in the decoupling mode as soon as a current flow direction from an output to an input of a respective output switching controller is detected and/or a set maximum current value is reached, and/or if a maximum permitted output voltage is reached in an overvoltage protection mode. In this way, an operator is quickly made aware of a fault.

BRIEF DESCRIPTION OF THE DRAWINGS

The invention is explained by way of example below with reference to the schematic illustrations in the appended figures, in which.

DETAILED DESCRIPTION OF THE PRESENTLY PREFERRED EMBODIMENTS

Figure 1:
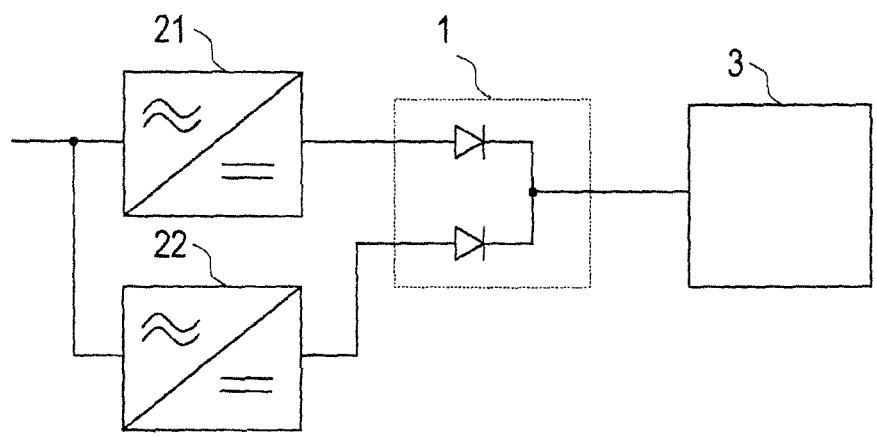
FIG. 1 shows a redundant power supply arrangement as per the prior art with two diodes.
Figure 2:
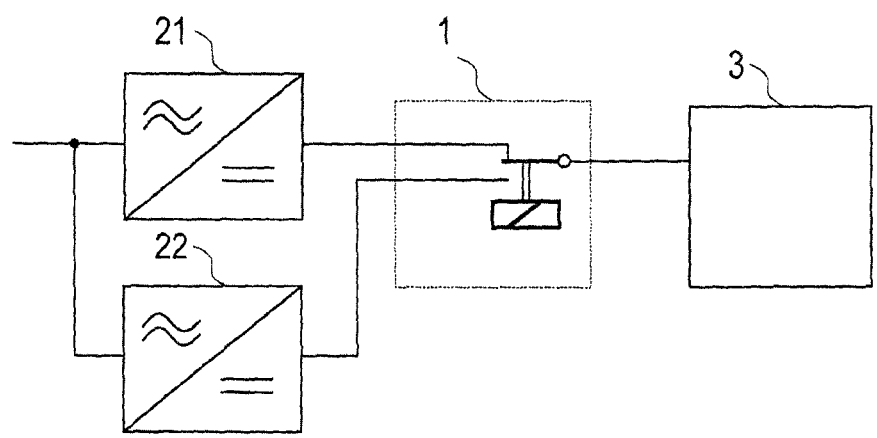
FIG. 2 shows a redundant power supply arrangement as per the prior art with a switch.

FIGS. 1 and 2 show redundant power supply arrangements as per the prior art. In this case, a redundancy circuit 1 coupled to a load 3 is connected to two separate supply units 21, 22. Each of these supply units 21, 22 represents a separate power supply device.

By contrast, according to the present invention, a power supply arrangement for redundantly supplying power to a load is adapted as a single device in a housing, wherein components not relevant to safety are included only once.

Figure 3:
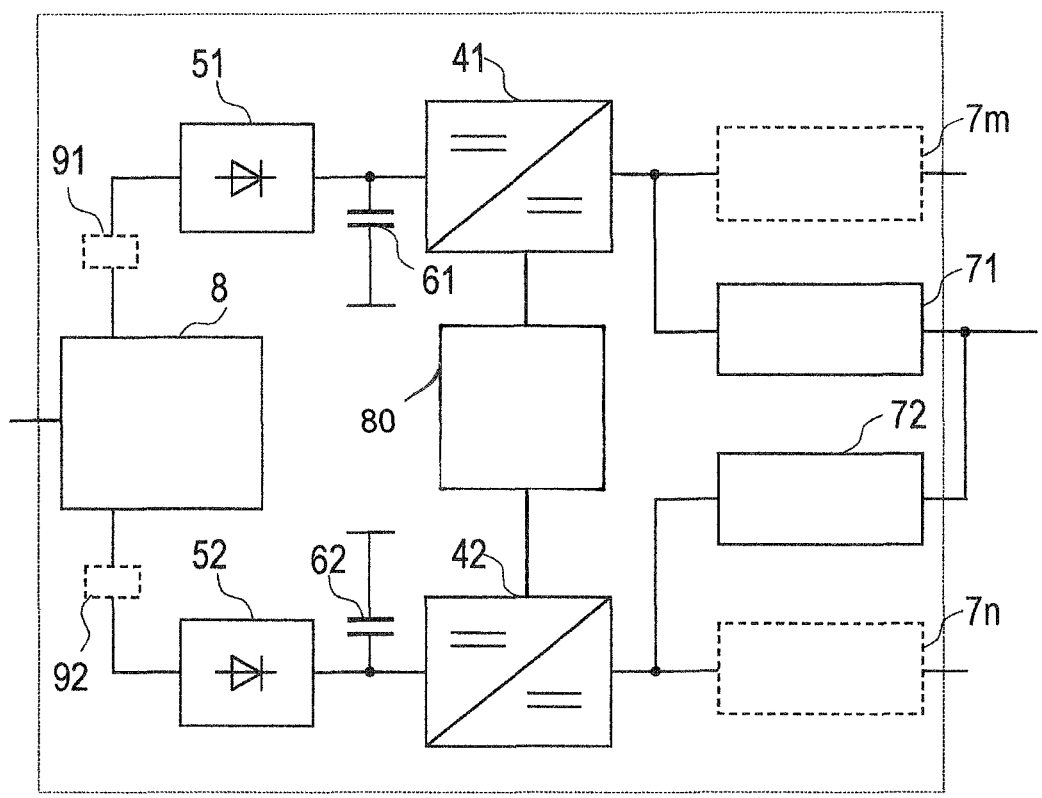
FIG. 3 shows a power supply arrangement with two parallel paths in accordance with one embodiment of the present invention.

As shown in FIG. 3, a power supply arrangement in accordance with one embodiment comprises only one passive filter 8, via which two paths are connected to a supply network. Each path comprises a rectifier unit 51 or 52, a DC link with capacitor 61 or 62, a DC-DC converter 41 or 42 and at least one output switching controller 71 or 72. A plurality of output switching controllers 71, 7m or 72, 7n can also be connected to each DC-DC converter 41 or 42, respectively.

A protection unit 91 or 92 is optionally arranged between the filter 8 and the DC-DC converter 41 or 42 in each case. The protection unit 91 or 92 takes the form of a fuse or an electronic current limiting element. In the event of a fault, the current through the faulty path is restricted or the path is completely isolated from the rest of the device circuit. The respective protection unit 91 or 92 is arranged either on the line side of the rectifier unit 51 or 52, which is located in the same current path, as indicated by broken marks in FIG. 3, or on the load side thereof.

Each path has its own regulating means. A supervisory control unit 80 provides shared voltage regulating unit. The supervisory control unit 80 is used, e.g., to ensure symmetry, i.e., the equal distribution of power over both paths. (A shared control unit 80 can also be used to provide alternating operation of the two paths, particularly if a connected load has low power consumption). The supervisory control unit 80 can also be supplied with operating parameters which provide information about the loading of critical switching elements. For example, depending on the temperature of critical components, the power can be distributed over the two paths using the control unit such that an even thermal load is produced.

In some embodiments, the supervisory control unit 80 ensures that the clock frequencies of the individual converters 41, 42 and output switching controllers 71, 7m, 72, 7n are synchronized. This synchronization advantageously takes place such that the clock frequencies are the same or are related in a way which can be predetermined. This prevents acoustic noise in the audible range, which can be produced by an aggregation of the clock frequencies and differential frequencies.

In the synchronizing mode, the supervisory control unit 80 can, moreover, enforce a phase shift of the clock frequencies of the converters 41, 42, wherein the phase shift can be predetermined, thereby reducing the current load on capacitors from which the two paths take their input energy and/or to which their energy is released.

The present power supply device is particularly advantageous for output powers of 500 W in total. Beyond this power, it is preferable to connect a plurality of smaller elements in parallel instead of one expensive powerful component. A single device structure can then be used as a power supply arrangement for providing high output power or as a redundant power supply arrangement. In both cases, the outputs of multiple converters are connected in parallel, only half of the total device power being utilized in the redundancy mode with two paths.

Figure 4:
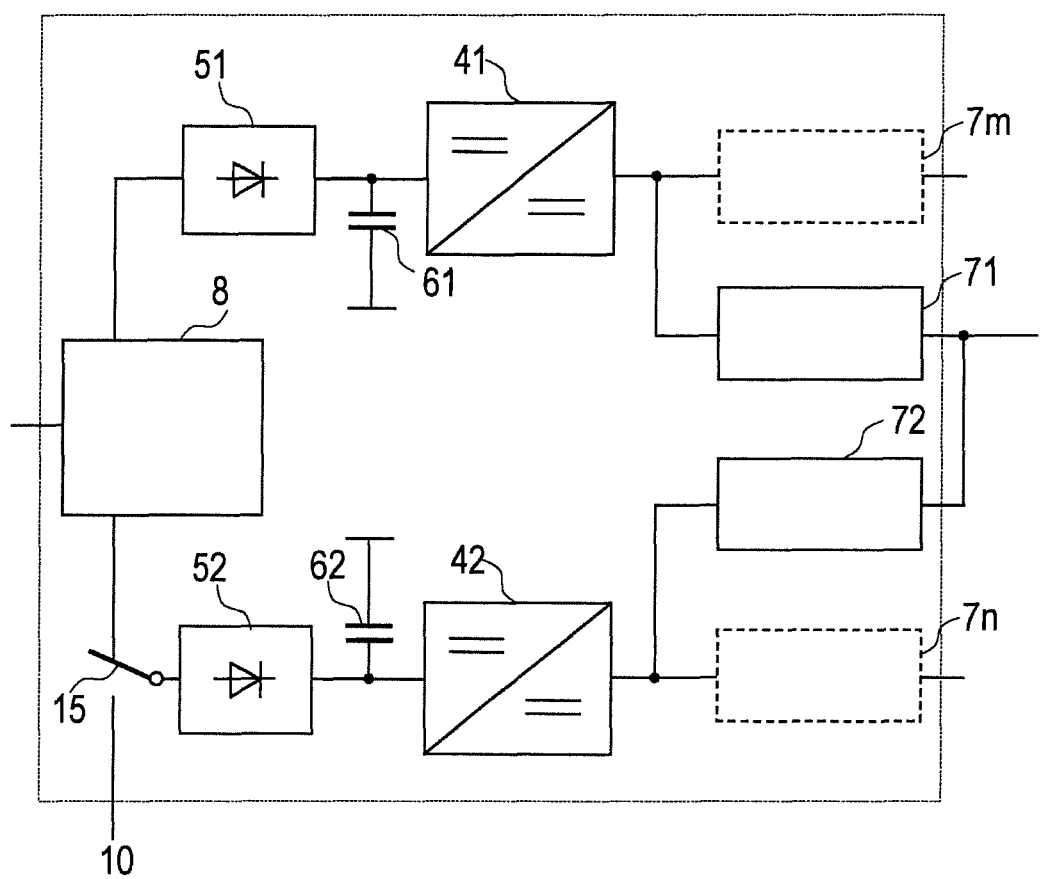
FIG. 4 shows a power supply arrangement with two parallel paths and device/apparatus for switching to an additional supply unit in accordance with one embodiment of the present invention.

By virtue of the device topography, a DC-DC converter 41 or 42 can easily be decoupled upstream or downstream of the associated rectifier unit 51 or 52. The lower of the paths illustrated in FIG. 4 can be decoupled from the network supply upstream of the rectifier unit 52. This is effected using a controlled switch 15, which switches to a different supply unit 10 in the event of a network failure. Such total redundancy allows the use of a second alternating voltage or direct voltage for buffered operation.

Figure 5:
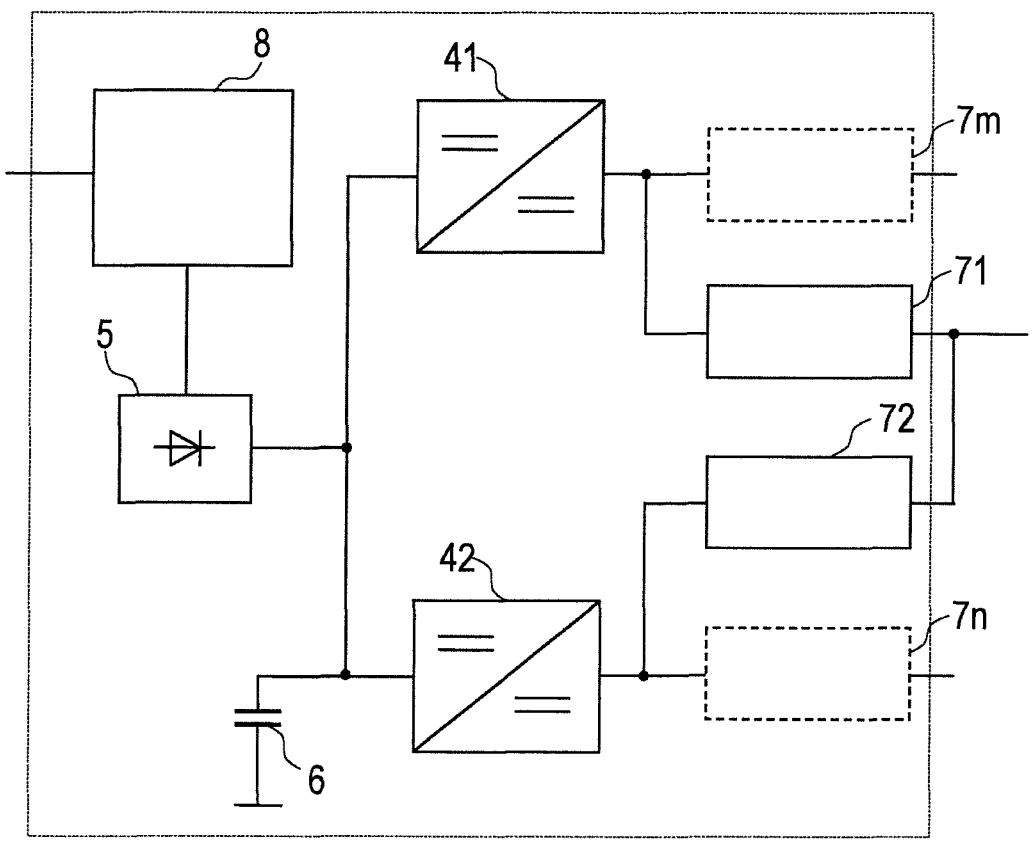
FIG. 5 shows a power supply arrangement with a DC link in accordance with one embodiment of the present invention.

If the safety requirement is reduced, the DC-DC converters 41, 42 are connected to a shared DC link 6. Said DC link 6 can be connected to a power supply network via a rectifier unit 5 and a shared filter 8, as shown in FIG. 5.

Figure 6:
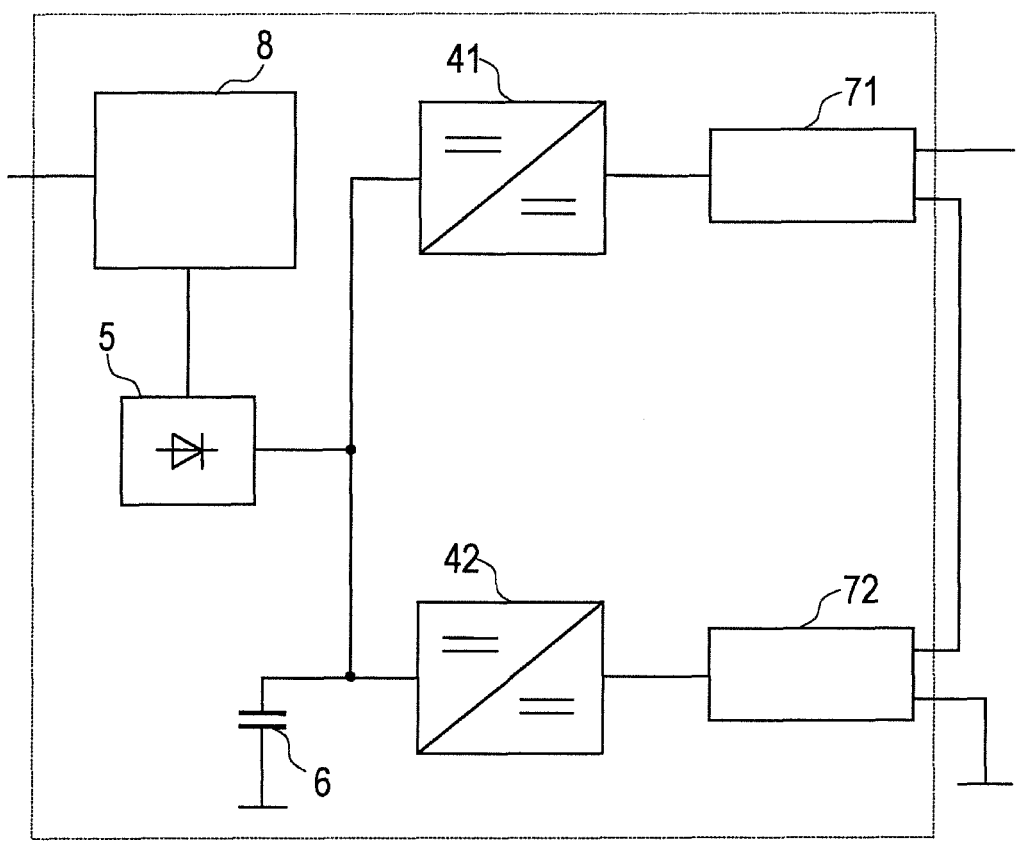
FIG. 6 shows a power supply arrangement with outputs connected in series in accordance with one embodiment of the present invention.

A further possibility is provided if the two paths are implemented to be electrically isolated. Such an arrangement can be used to double the output voltage by connecting the outputs of the output switching controllers 71, 72 in series, as shown in FIG. 6.

Figure 7:
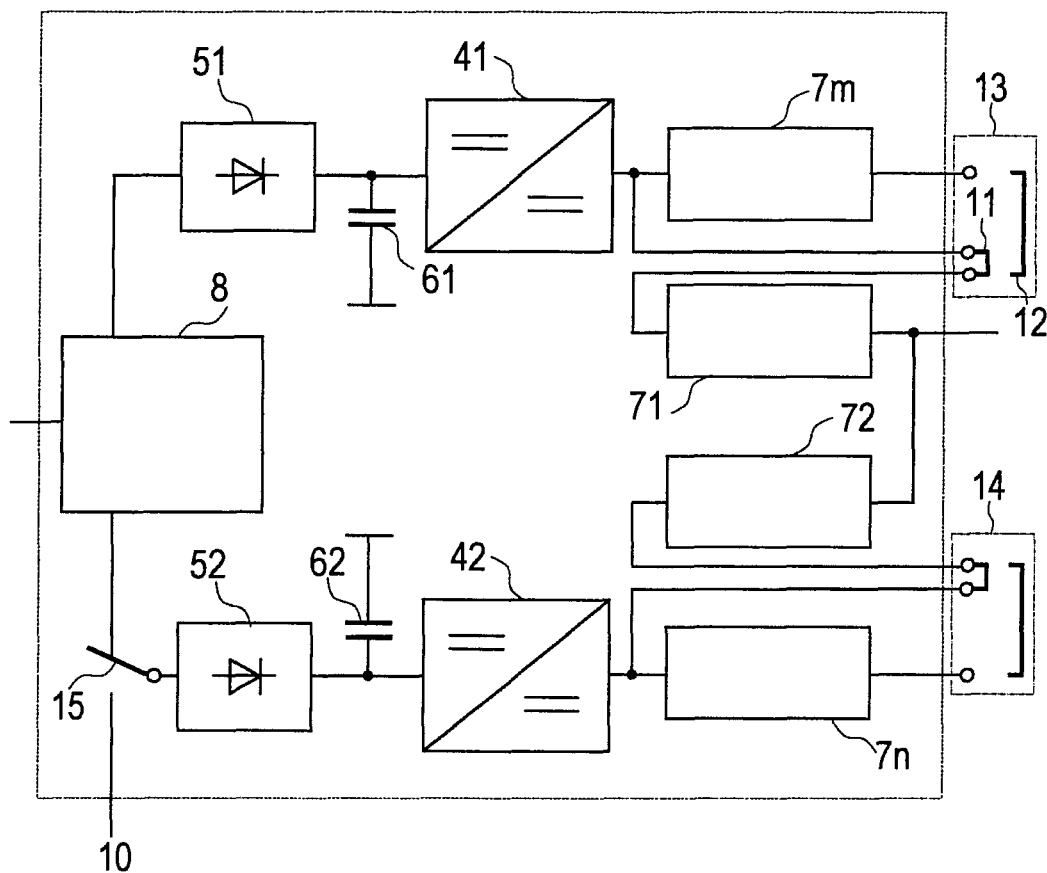
FIG. 7 shows a power supply arrangement with switchable outputs in accordance with one embodiment of the present invention.

An arrangement having full redundancy and the ability to manage short-circuit faults at an output switching controller 7n or 7m is shown in FIG. 7. In the upper of the paths shown here, the output of the first DC-DC converter 41 and the input of the first output switching controller 71 are routed to a first switch unit 13 of the device. The output of a further first output switching controller 7m is also routed to this first switch unit 13. The switch unit 13 includes a mechanical switch or exchangeable plug-in contacts 11, 12 (jumpers), for example. During normal operation, the first switch unit 13 connects the output of the first DC-DC converter 41 to the input of the first output switching controller 71. The output of the further first output switching controller 7m can be used in another way.

In an increased safety mode, the connection between first DC-DC converter 41 and first output switching converter 71 is removed. The first switch unit 13 instead connects the output of the further first output switching controller 7m to the input of the first output switching converter 71.

In a similar manner, the second DC-DC converter 42 and the second output switching converter 72 and an additional second output switching converter 7n can be switched using a second switch unit 14.

Figure 8:
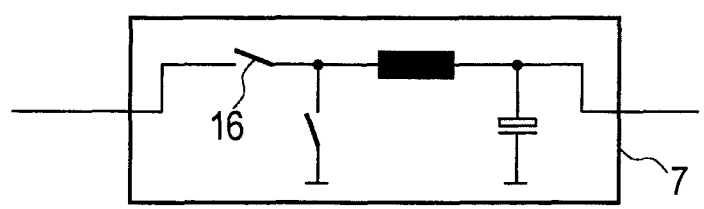
FIG. 8 shows a step-down switching controller in accordance with one embodiment of the present invention.

The output switching converters 71, 72, 7m, 7n are adapted as step-down switching controllers 7, as illustrated in FIG. 8. In the increased safety mode, the switch 16 of the step-down switching controller 71 or 72 connected on the load side then operates as an active decoupling diode. As soon as a short circuit occurs in a path, this path is isolated using the switch 16.

In one embodiment, the mechanical switch unit 13 or 14 is configured such that a signal is generated in the event of an increased safety requirement, wherein the signal instructs the control unit of the respective output switching controller 71 or 72 connected on the load side to operate as a decoupling module. In this decoupling mode based on decoupling diode, the respective control unit has the task of activating those semiconductor switches in the most direct current path between input and output of the output switching controller 71 or 72 in such a way that current cannot flow from the output of the respective output switching controller 71 and 72 to the input at any time. In this case, the control unit is configured to activate the semiconductors in the current path in such a way that they exhibit the least possible losses when conducting the current.

According to one embodiment, the current limit of the respective output switching controller 71 or 72 being used as a decoupling module is deactivated, and disconnection only takes place if a reversal of the current direction is detected. Alternatively, the current limit is set to a value which is higher by at least the setting tolerance and the expected age drift than the current limit of the output switching controller 7m or 7n on the line side, which regulates the output voltage and the current limit. Likewise, the voltage regulator of the output switching controller 71 or 72 being used as a decoupling diode is preferably disconnected or set so high that it is not applicable during normal operation.

In the case of an increased safety requirement, the voltage regulator of the decoupling module can be used as an overvoltage protection element by setting the voltage regulator to a value which corresponds to the upper limit of the voltage sensitivity tolerance range of a load to be connected. In the event of a fault, the device preferably emits a warning signal in one of the safety measures described above.

By virtue of the embodiment comprising dual safety in respect of current and voltage, it is also possible to satisfy the requirements of specific safety standards such as, e.g., UL Class 2, wherein the ability to limit the power that can be discharged at the output represents an essential requirement.

The invention is not restricted to devices having two parallel connected paths. A device according to the invention may also comprise three or more parallel paths, thereby increasing the failure protection.

Figure 9:
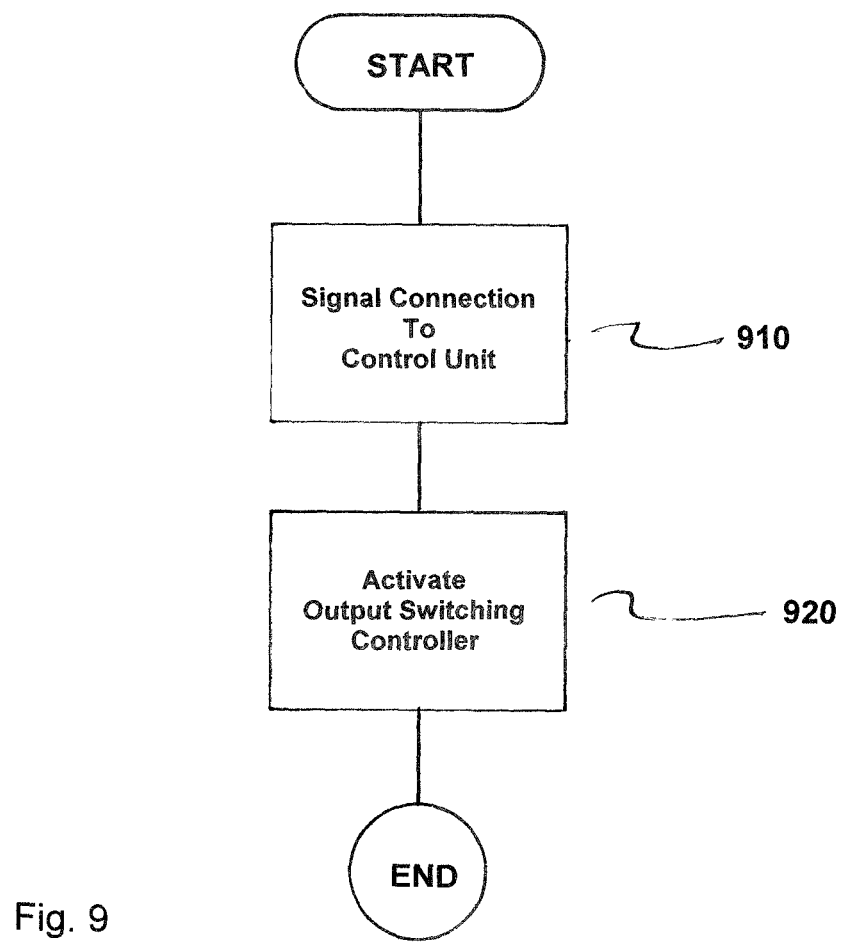
FIG. 9 is a flowchart of the method in accordance with the present invention.

FIG. 9 is a flowchart of a method for operating a power supply device. The method comprises signaling to a control unit a connection of the input of one output switching controller to the output of an additional output switching controller by a switch unit, as indicated in step 910. Next, the output switching controller connected on the load side is activated as a decoupling diode, as indicated in step 920.

Although the present invention has been described above with reference to presently preferred embodiments, it is not limited thereto but rather can be modified in a wide variety of ways. In particular, the invention can be altered or modified in multifarious ways without departing from the essence of the invention.

The invention claimed is:

1. A power supply device for redundantly supplying power to a load, comprising:
    a first supply unit and a second supply unit, wherein the first and second supply units are interconnected;
    a first DC-DC converter and a second DC-DC converter; and
    a first output switching controller and a second output switching controller;
    wherein the first output switching controller is connected on a load side of the first DC-DC converter and the second output switching controller is connected on the load side of the second DC-DC converter;
    wherein the outputs of the first and second output switching controllers are interconnected;
    wherein at least two output switching controllers are connected on the load side of each of the first and second DC-DC converters;
    wherein an additional first output switching controller is connected on the load side of the first DC-DC converter and wherein an additional second output switching controller is connected on the load side of the second DC-DC converter;
    wherein the power supply device further comprises a first switch unit and a second switch unit;
    wherein the output of the first DC-DC converter, the input of the first output switching controller and the output of the additional first output switching controller are routed to the first switch unit of the device;
    wherein the input of the first output switching controller is configured to switch between the output of the first DC-DC converter and the output of the additional first output switching controller using the first switch unit;
    wherein the output of the second DC-DC converter, the input of the second output switching controller and the output of the additional second output switching controller are routed to the second switch unit of the device; and
    wherein the input of the second output switching controller is configured to switch between the output of the second DC-DC converter and the output of the additional second output switching controller using the second switch unit.

2. The power supply device of claim 1, further comprising a supervisory control unit for predetermining the power distribution of the output switching controllers.

3. The power supply device of claim 2, wherein the supervisory control unit is configured to provide symmetry of power at the output switching controllers.

4. The power supply device of claim 2, wherein at least one operating parameter is supplied to the supervisory control unit, and wherein the supervisory control unit is configured to influence the operation of the first and second DC-DC converters and of the first and second output switching controllers as a function of the at least one operating parameter.

5. The power supply device of claim 1, wherein each of the first and second DC-DC converters comprises a resonance converter.

6. The power supply device of claim 1, further comprising a dedicated protection unit that is connected on at an input side of each of the first and second DC-DC converters; and wherein the dedicated protection unit is configured to separate the respective DC-DC converter from the rest of the device circuit in the event of a predetermined overload.

7. The power supply device of claim 1, further comprising a dedicated DC link that is connected on the line side of each of the first and second DC-DC converters and to a supply network via a rectifier unit.

8. The power supply device of claim 7, wherein a connection interface of at least one DC link is configured to switch between a supply network and a supply unit using a switch.

9. The power supply device of claim 1, wherein the first and second DC-DC converters are connected to a shared DC link, which can be connected to a supply network via a rectifier unit.

10. The power supply device of claim 7, wherein the rectifier unit is connected to a supply network via a passive filter.

11. The power supply device of claim 1, wherein the outputs of the first and second output switching controllers are interconnected in series.

12. The power supply device of claim 1, wherein each of the first and second output switching controller comprises a step-down switching controller.

13. A method for operating a power supply device of claim 1, comprising:
  signaling to a control unit a connection of an input of one output switching controller to an output of an additional output switching controller by a switch unit; and
  activating the output switching controller connected on load side as a decoupling diode.

14. The method of claim 13, further comprising predetermining a current limit for each of the first and second output switching controllers activated as the decoupling diode, wherein the current limit is set higher by at least a setting tolerance and an expected age drift than a current limit of the output switching controller connected on the line side.

15. The method of claim 13, further comprising setting a voltage regulating unit for each of the first and second output switching controllers activated as the decoupling diode to a value which is higher by at least a setting tolerance and an expected age drift than a maximum output voltage that is set for the output switching controller connected on the line side.

16. The method of claim 13, further comprising monitoring current flow direction in the decoupling mode, and interrupting the current flow if the current flows from the output to the input of the respective output switching controller.

17. The method of claim 13, further comprising predetermining a maximum permitted output voltage for a voltage regulating unit of one of the first and second output switching controllers which is activated as the decoupling diode.

18. The method of claim 13, further comprising generating a warning signal in the decoupling mode if a current flow direction from an output to an input of a respective output switching controller is detected and/or a set maximum current value is reached, and/or if a maximum permitted output voltage is reached in an overvoltage protection mode.

\* \* \* \* \*